US009732926B2

(12) United States Patent
Hiratsuka et al.

(10) Patent No.: US 9,732,926 B2
(45) Date of Patent: Aug. 15, 2017

(54) ILLUMINATION SYSTEM FOR GENERATING A BOUNDARY BETWEEN A SHADED AREA AND AN IRRADIATED AREA

(71) Applicant: TOYOTA JIDOSHA KABUSHIKI KAISHA, Toyota-shi, Aichi-ken (JP)

(72) Inventors: Shigeyoshi Hiratsuka, Nagakute (JP); Toshihiko Tsukada, Nagakute (JP); Shin-ichi Kojima, Nagakute (JP); Nobuyuki Shiraki, Nagakute (JP); Keiichi Shimaoka, Nagakute (JP); Kazuya Asaoka, Seto (JP); Sho Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 14/813,998

(22) Filed: Jul. 30, 2015

(65) Prior Publication Data
US 2016/0033102 A1 Feb. 4, 2016

(30) Foreign Application Priority Data
Aug. 1, 2014 (JP) ................. 2014-157902

(51) Int. Cl.
*B60Q 1/08* (2006.01)
*F21S 8/10* (2006.01)
(Continued)

(52) U.S. Cl.
CPC .......... *F21S 48/1705* (2013.01); *B60Q 1/085* (2013.01); *B60Q 1/143* (2013.01);
(Continued)

(58) Field of Classification Search
CPC ............... F21S 48/1705; F21S 48/1388; F21S 48/1757; F21S 48/1752; F21S 48/171;
(Continued)

(56) References Cited

U.S. PATENT DOCUMENTS

| 6,795,085 B1 * | 9/2004 | Doherty | ............... G09G 3/2055 345/596 |
| 2005/0179706 A1 * | 8/2005 | Childers | ............. G02F 1/13318 345/690 |

(Continued)

FOREIGN PATENT DOCUMENTS

| EP | 2292464 A1 | 3/2011 |
| JP | H08-511635 A | 12/1996 |

(Continued)

*Primary Examiner* — Andrew Coughlin
*Assistant Examiner* — Michael Chiang
(74) *Attorney, Agent, or Firm* — Oliff PLC

(57) ABSTRACT

An illumination system includes: a light irradiation unit that projects light toward a predetermined illumination area; an image acquisition unit that acquires an image of the illumination area; an object detecting unit that detects a shading object based on image information of the illumination area, acquired by the image acquisition unit; an information generating unit that generates the control information for setting each of the plurality of reflecting mirrors to an on state or an off state such that a plurality of irradiation patterns are alternately irradiated, each of the plurality of irradiation patterns having different arrangement of the dark pixels and the light pixels from each other; and an irradiation control unit that controls the light irradiation unit based on the generated control information.

8 Claims, 12 Drawing Sheets

(51) Int. Cl.
  *B60Q 1/14* (2006.01)
  *G02B 26/08* (2006.01)
  *G02B 27/01* (2006.01)
  *G06T 7/70* (2017.01)

(52) U.S. Cl.
  CPC ....... *F21S 48/1388* (2013.01); *F21S 48/1747* (2013.01); *F21S 48/1757* (2013.01); *G02B 26/0833* (2013.01); *G02B 27/01* (2013.01); *G06T 7/70* (2017.01); *B60Q 2300/42* (2013.01); *B60Q 2300/45* (2013.01); *G02B 2027/014* (2013.01); *G02B 2027/0118* (2013.01); *G06T 2207/30252* (2013.01)

(58) Field of Classification Search
  CPC .. G02B 26/0833; B60Q 1/143; B60Q 1/1415; B60Q 1/14
  USPC .......................................................... 362/466
  See application file for complete search history.

(56) References Cited

U.S. PATENT DOCUMENTS

2009/0046474 A1* 2/2009 Sato ....................... B60Q 1/076
                                                              362/466
2016/0368413 A1* 12/2016 Nishii ................... B60Q 1/143

FOREIGN PATENT DOCUMENTS

| JP | 2011-051441 A | 3/2011 |
| JP | 2012-190594 A | 10/2012 |
| JP | 2013-076923 A | 4/2013 |
| WO | 95/27970 A1 | 10/1995 |

\* cited by examiner

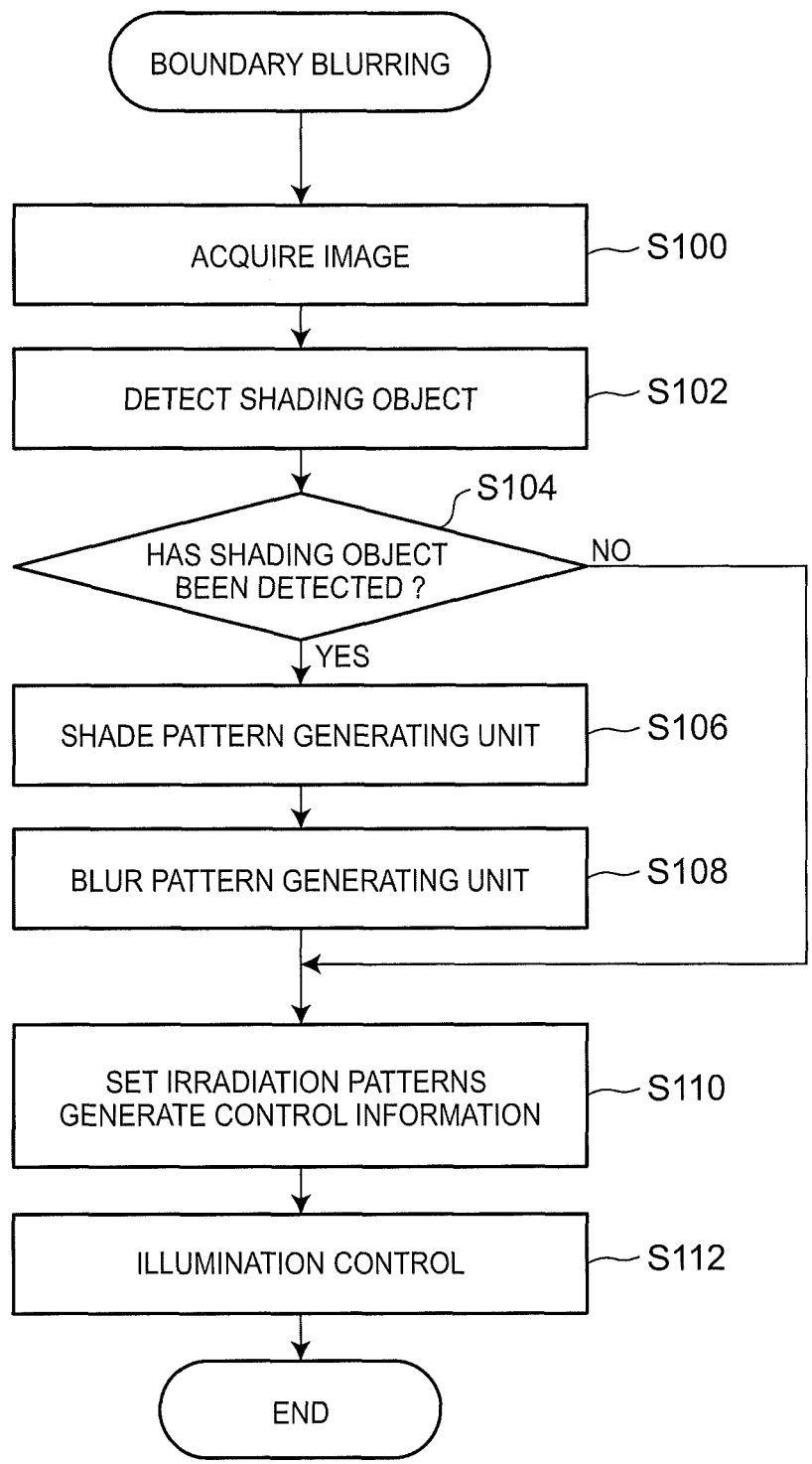

FIG. 8A
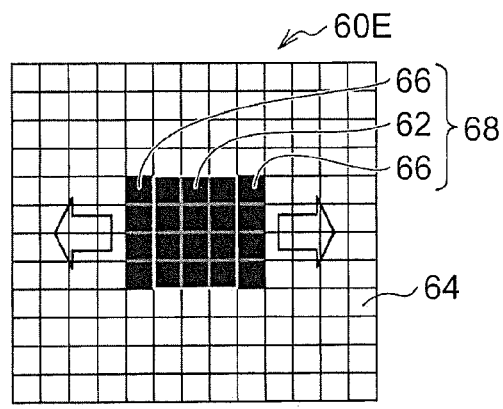
FIG. 8B
FIG. 8C
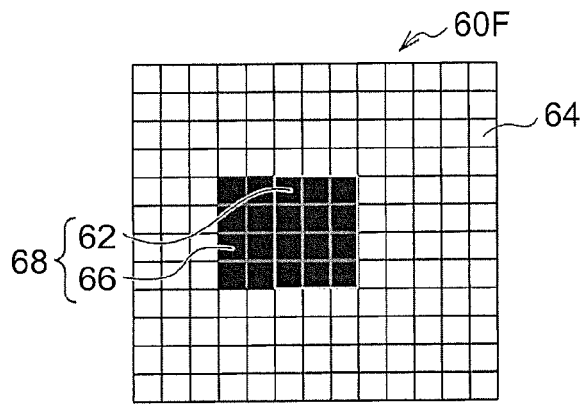
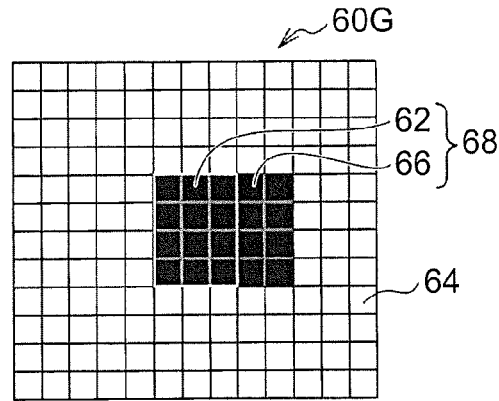

ILLUMINATION SYSTEM FOR GENERATING A BOUNDARY BETWEEN A SHADED AREA AND AN IRRADIATED AREA

INCORPORATION BY REFERENCE

The disclosure of Japanese Patent Application No. 2014-157902 filed on Aug. 1, 2014 including the specification, drawings and abstract is incorporated herein by reference in its entirety.

BACKGROUND OF THE INVENTION

1. Field of the Invention

The invention relates to an illumination system.

2. Description of Related Art

There is known a display device including an array of on/off switchable elements, such as a spatial modulator (digital mirror) formed of movable micromirrors that deflect light irradiated from a light source. In a display device described in Japanese Patent No. 3844013, a gray scale is provided by using time division modulation in order to change each element between an on state where light is directed toward a display and an off state where light is not directed toward the display. That is, by carrying out on/off switching at a high speed (high-frequency drive) through control over a duty ratio, intermediate brightness between the on state and the off state is presented (see Japanese Patent No. 3844013).

A projection device described in Japanese Patent Application Publication No. 2013-76923 (JP 2013-76923 A) includes projection means including a projection optics system that forms and projects a light figure corresponding to an image signal by using light from a light source. In this projection device, "blur lighting" that blurs the periphery of a projected image is achieved by, for example, adjusting the focus to a non-focus state where the projection optics system sets a zoom angle of view to the maximum angle of view (adjusting the optics system) (see JP 2013-76923 A).

There is suggested a vehicle illumination system that controls light distribution with a digital mirror including a plurality of movable micromirrors (see Japanese Patent Application Publication No. 2012-190594 (JP 2012-190594 A)). There is also suggested a vehicle headlamp system that automatically shades part of an illumination area in order to prevent glare during traveling (see Japanese Patent Application Publication No. 2011-051441 (JP 2011-051441 A)).

However, in the vehicle illumination system that controls light distribution with the digital mirror, when part of the illumination area is shaded, the boundary between a shaded area within the illumination area and an irradiated area adjacent to the shaded area becomes distinct, so there is an inconvenience that a visual feeling of strangeness arises.

A method of blurring the boundary between a shaded area and an irradiated area includes, for example, the method described in Japanese Patent No. 3844013, which carries out high-frequency drive, and the method described in JP 2013-76923 A, which adjusts the optics system. However, the former has such an inconvenience that the service life of the digital mirror becomes short because of high-frequency drive, and the latter has such an inconvenience that a new movable optics system is required.

SUMMARY OF THE INVENTION

An aspect of the invention provides an illumination system. The illumination system includes: a light irradiation unit including a light source, a reflecting mirror array, and a projecting portion, the reflecting mirror array including a plurality of reflecting mirrors arranged on a substrate, each of the plurality of reflecting mirrors being configured to be independently driven between an on state and an off state based on control information and reflect light, irradiated from the light source, in a direction corresponding to the on state or the off state, the projecting portion being configured to project the light, reflected by the reflecting mirrors in the on state, toward a predetermined illumination area; an image acquisition unit configured to acquire an image information of the illumination area; an object detecting unit configured to detect a shading object based on the image information of the illumination area, acquired by the image acquisition unit; an information generating unit configured to generate the control information for setting each of the plurality of reflecting mirrors to the on state or the off state such that a plurality of irradiation patterns are alternately irradiated, each of the plurality of irradiation patterns being a pattern in which a shaded area and dark pixels and light pixels around the shaded area are arranged, the shaded area comprising a plurality of dark pixels that shade the shading object, each of the plurality of irradiation patterns having different arrangement of dark pixels and arrangement of light pixels from each other; and an irradiation control unit configured to control the light irradiation unit based on the generated control information.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a flowchart that shows an example of the procedure of boundary blurring;

FIG. 8A to FIG. 8C are schematic views that show another example of a set of irradiation patterns;

DETAILED DESCRIPTION OF EMBODIMENTS

Hereinafter, an example embodiment of the invention will be described in detail with reference to the accompanying drawings.

Configuration of Illumination System

Figure 1:
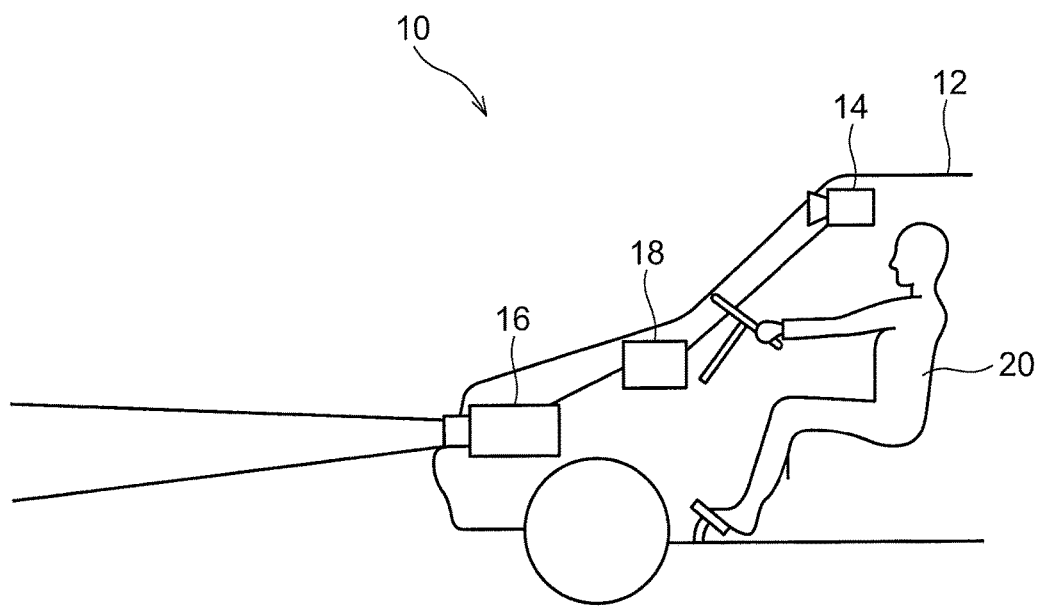
FIG. 1 is a schematic view that shows an example of the configuration of an illumination system according to an embodiment of the invention.

Initially, an illumination system will be described. FIG. 1 is a schematic view that shows an example of the configuration of the illumination system according to the embodiment of the invention. As shown in FIG. 1, the illumination system 10 according to the embodiment is mounted on a host vehicle 12. The illumination system 10 includes an imaging device 14, headlights 16 and a controller 18. The imaging device 14 and the headlights 16 each are connected to the controller 18. The controller 18 controls the headlights 16 based on a forward image captured by the imaging device 14.

The imaging device 14 is, for example, installed at the position of a rear-view mirror in a vehicle cabin at the level of an eyepoint of a driver 20. The imaging device 14 captures an image ahead of the host vehicle 12 and then outputs the image information of the captured image to the controller 18. The image ahead of the host vehicle 12 includes an illumination area that is illuminated by the headlights 16. For example, a night vision camera, such as an infrared camera, or a visible camera, such as a charge-coupled device, is used as the imaging device 14. In the present embodiment, an example in which thermal imagery information is obtained by capturing an image with the use of a night vision camera will be described.

The headlights 16 are installed at the front end of the host vehicle 12. Although not shown in the drawing, the headlights 16 are respectively installed at the right and left sides of the front end of the host vehicle 12. The headlights 16 installed at the right and left sides are arranged substantially symmetrically. As will be described later, each headlight 16 includes a variable light distribution light 22 and a light drive unit 24 (see FIG. 4). The light drive unit 24 controls light that is irradiated from the variable light distribution light 22 based on control information generated by the controller 18. Thus, the headlights 16 are able to project light in various irradiation patterns.

The controller 18 is configured as a computer that executes control over the system as a whole and various computations. Specifically, the controller 18 includes a central processing unit (CPU), a read only memory (ROM), a random access memory (RAM), a nonvolatile memory, and input/output interfaces (I/O). The ROM stores various programs. The nonvolatile memory stores various pieces of information. The CPU, the ROM, the RAM, the nonvolatile memory and the I/O are connected to one another via a bus.

In the present embodiment, a control program for "boundary blurring" (described later) is stored in the ROM in advance. The CPU reads a control program stored in the ROM, and executes the read program by using the RAM as a work area. The functions of the controller 18 will be described later (see FIG. 4).

Variable Light Distribution Light

Figure 2C:
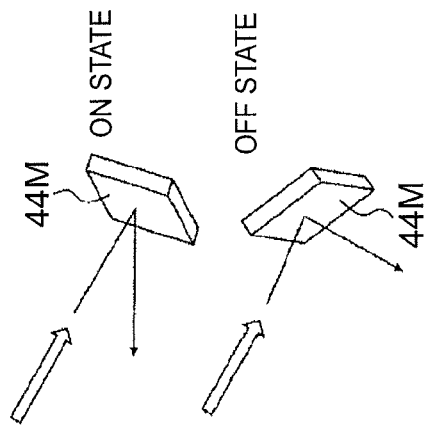
FIG. 2A to FIG. 2C are schematic views that show an example of the configuration of a variable light distribution light.
Figure 2B:
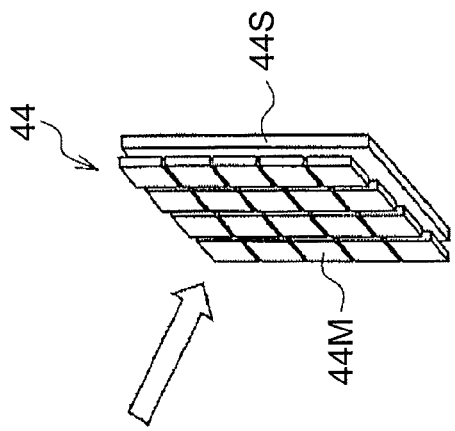
Figure 2A:
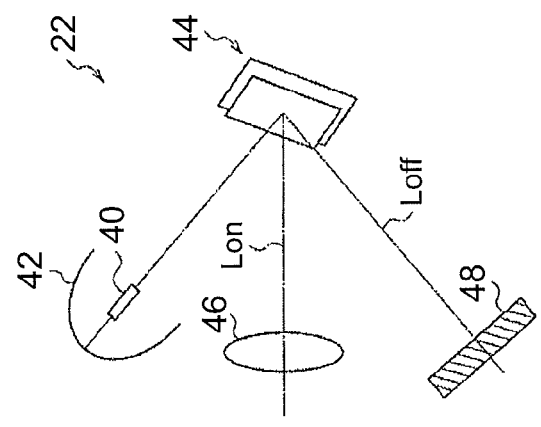

The configuration of the variable light distribution light 22 will be described. FIG. 2A to FIG. 2C are schematic views that show an example of the configuration of the variable light distribution light 22. As shown in FIG. 2A, the variable light distribution light 22 includes a light source 40, a concave spherical mirror 42, a reflecting mirror array 44, a light projection lens 46 and a light absorber 48. The light source 40 is arranged inside the concave spherical mirror 42. A high-intensity discharge lamp, such as a halogen lamp and an HID bulb, a high-intensity light source, such as a light-emitting diode, or the like, may be used as the light source 40.

The light source 40 is turned on or off by the light drive unit 24 in response to the switching operation of a switch (not shown). That is, each headlight 16 is turned on or off through the switching operation of the switch (not shown). As shown in FIG. 2B, the reflecting mirror array 44 includes a plurality of reflecting mirrors 44M arranged on a substrate 44S. As shown in FIG. 2C, each of the plurality of reflecting mirrors 44M is independently driven between an on state and an off state by the light drive unit 24 based on control information from the controller 18. The driving frequency of the reflecting mirror array 44 that is not driven at a high frequency is about 100 Hz.

Light emitted from the light source 40 is reflected by the concave spherical mirror 42, and is then irradiated toward the surface of the reflecting mirror array 44. Light reflected by the reflecting mirrors 44M in the on state enters the light projection lens 46 through an optical path $L_{on}$. The light projection lens 46 projects the entered light forward of the vehicle. On the other hand, light reflected by the reflecting mirrors 44M in the off state is irradiated toward the light absorber 48 through an optical path $L_{off}$. The light absorber 48 absorbs the irradiated light. That is, light in an irradiation pattern corresponding to the on/off states of the reflecting mirror array 44 is irradiated through on/off control over the reflecting mirror array 44.

Partially Shaded Illumination

Figure 3:
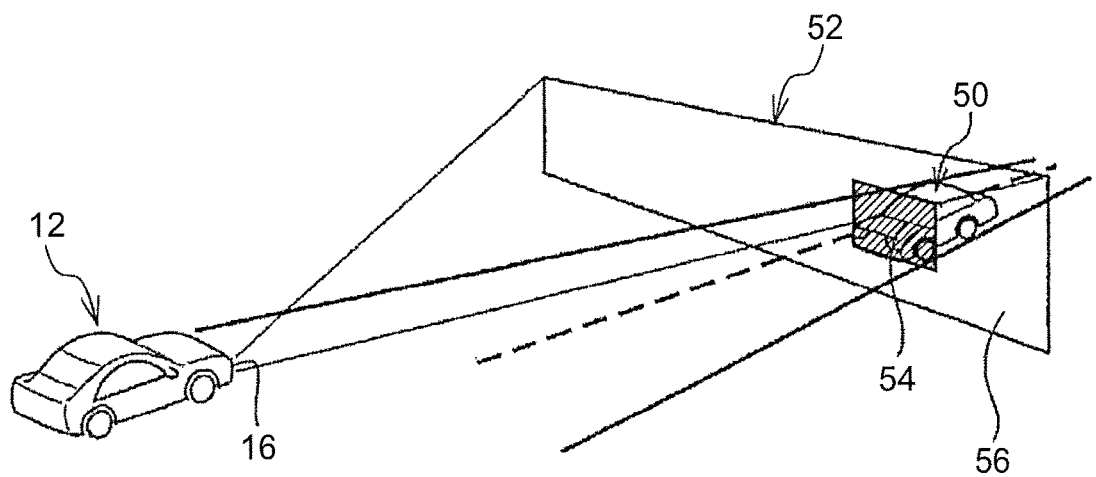
FIG. 3 is a view that illustrates a method of partially shaded illumination.

Next, partially shaded illumination will be described. FIG. 3 is a view that illustrates a method of partially shaded illumination. The headlights 16 of the host vehicle 12 irradiate light toward an illumination area 52 ahead of the vehicle. The imaging device 14 captures an area ahead of the vehicle, including the illumination area 52. When a shading object 50 has been detected within the illumination area 52 based on the captured image, the headlights 16 irradiate light in the irradiation pattern in which the shading object 50 is included in the shaded area 54. Thus, light toward the shading object 50 is shaded. The "shading object" is an object for which it is desirable to reduce dazzling due to illumination, and specifically includes a pedestrian, an oncoming vehicle, and the like.

In the above-described partially shaded illumination, when light toward part of the illumination area 52 is shaded, the boundary between the shaded area 54 and an irradiated area 56 adjacent to the shaded area 54 becomes distinct, causing a visual feeling of strangeness. In the present embodiment, by utilizing an afterimage phenomenon at the time when a plurality of irradiation patterns are alternately irradiated, a boundary area in which lightness changes in a stepwise manner is generated between the shaded area 54 and the irradiated area 56. Thus, it is possible to reduce a visual feeling of strangeness. Hereinafter, a specific technique will be described.

Functional Configuration of Controller

Figure 4:
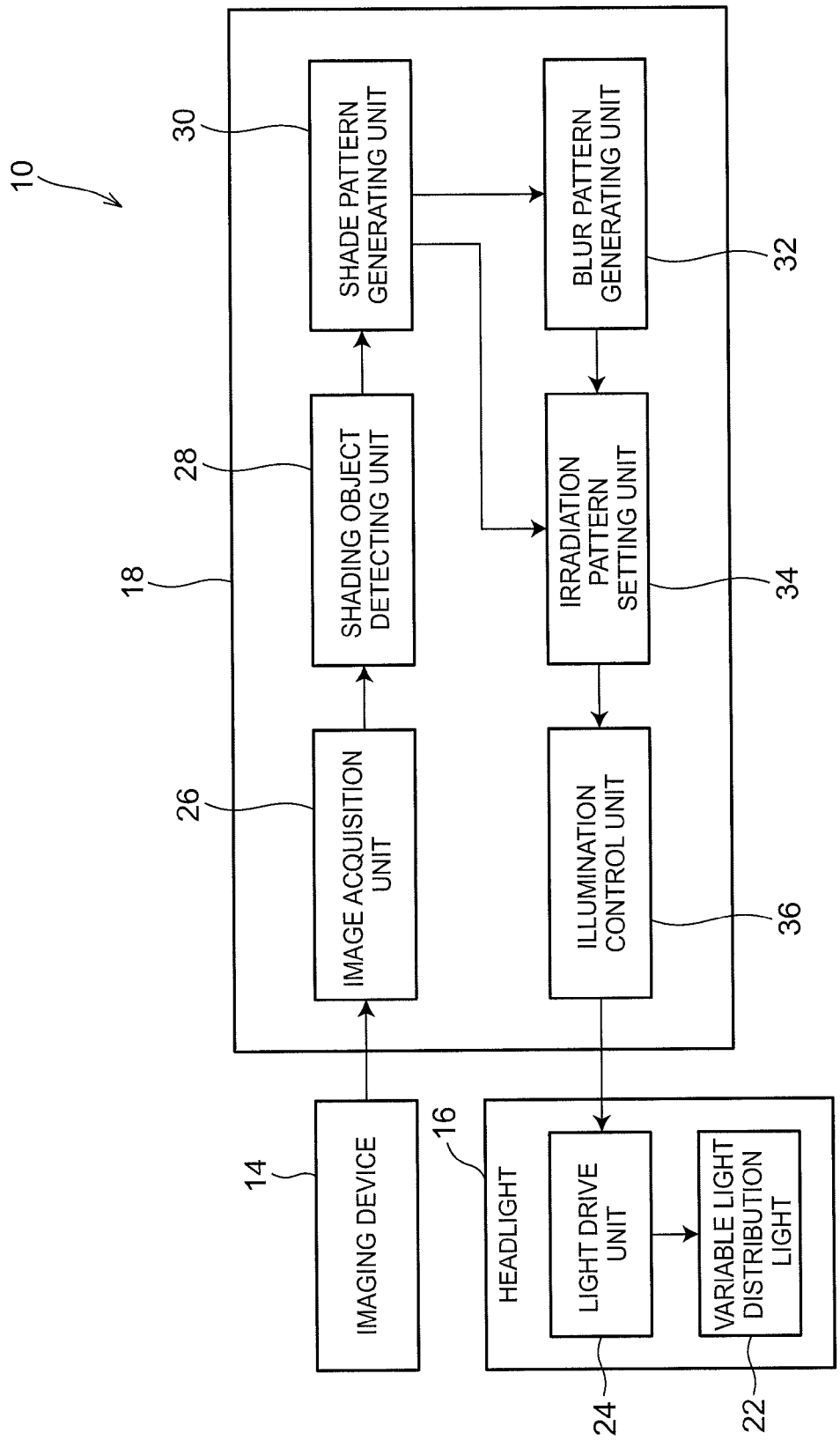
FIG. 4 is a functional block diagram that shows an example of the configuration of the illumination system according to the embodiment of the invention.

Next, the functions of the controller 18 will be described. FIG. 4 is a functional block diagram that shows an example of the illumination system 10 according to the embodiment of the invention. As shown in FIG. 4, the controller 18 includes an image acquisition unit 26, a shading object detecting unit 28, a shade pattern generating unit 30, a blur pattern generating unit 32, an irradiation pattern setting unit 34 and an irradiation control unit 36.

The image acquisition unit 26 acquires an image captured by the imaging device 14. The image acquisition unit 26 includes an A/D converter, an image memory, and the like.

The A/D converter converts an analog signal, input from the imaging device 14, to a digital signal. The image memory stores a digital signal as image information. The image acquisition unit 26 acquires image information from the imaging device 14 at predetermined intervals (for example, a frequency of about 30 Hz), and temporarily keeps the digitized image information in the image memory.

The shading object detecting unit 28 detects a shading object from the image acquired by the image acquisition unit 26. An existing known technique, such as pattern matching and extraction of a high-intensity area, may be used as a method of detecting a shading object, so the detailed description is omitted here.

The shade pattern generating unit 30 identifies the position of the shading object in the illumination area, and generates a "shade pattern" in which the shading object is included in a shaded area. The shade pattern is an irradiation pattern formed of a shaded area including a plurality of dark pixels and an irradiated area including a plurality of light pixels. A specific example will be described later.

The blur pattern generating unit 32 generates a "blur pattern" for blurring the boundary between the shaded area and the irradiated area by using an afterimage effect. The blur pattern includes a plurality of irradiation patterns. Each of the plurality of irradiation patterns is formed of a shaded area including a plurality of dark pixels and an irradiated area including a plurality of light pixels. Each irradiation pattern has different arrangement of dark pixels and light pixels around the shaded area from each other. A specific example will be described later.

The irradiation pattern setting unit 34 selects the irradiation patterns to be alternately irradiated from among the generated shade pattern and the generated plurality of blur patterns, and sets the selected irradiation patterns. At the same time, an irradiation time, the number of times of irradiation, the irradiation order of the selected irradiation patterns, and the like, are set. When no shading object has been detected, a "full light pattern" in which the overall illumination area is set as the irradiated area is set for the irradiation pattern.

The irradiation time is an update period from when setting of the irradiation pattern has completed to when setting of the next irradiation pattern completes based on the next image. The number of times of irradiation is the number of times the irradiation pattern is changed. For example, when the update period is 10 Hz and the drive frequency of the reflecting mirror array 44 is 100 Hz, the number of times of irradiation is up to ten. In other words, when a time required to update is 0.1 seconds and the on/off switching time of the reflecting mirror array 44 is 0.01 seconds, it is possible to switch the irradiation pattern up to ten times.

The irradiation pattern setting unit 34 generates control information for setting each of the plurality of reflecting mirrors 44M of the reflecting mirror array 44 to the on state or the off state, based on a set condition. The irradiation control unit 36 controls irradiation of light from the variable light distribution lights 22 via the corresponding light drive units 24 based on the control information generated by the irradiation pattern setting unit 34.

Boundary Blurring

Next, "boundary blurring" will be specifically described. FIG. 5 is a flowchart that shows an example of the procedure of "boundary blurring". When the headlights 16 are turned on through the switching operation of the switch (not shown), the CPU of the controller 18 starts executing the "boundary blurring", and repeatedly executes the "boundary blurring" at predetermined time intervals. The predetermined time intervals may be, for example, the above-described update period (for example, 10 Hz), or may be a period (for example, 30 Hz) at which image information is acquired from the imaging device 14.

In step 100, an image ahead of the vehicle, captured by the imaging device 14, is acquired. Specifically, latest image information is read from the image memory. Subsequently, in step 102, a shading object is detected from the acquired image. Subsequently, in step 104, it is determined whether a shading object has been detected. When a shading object has been detected, the process proceeds to step 106; whereas, when no shading object is detected, the process proceeds to step 110.

Subsequently, in step 106, the position of the shading object in the illumination area is identified, and a "shade pattern" in which the shading object is included in the shaded area is generated. Subsequently, in step 108, a "blur pattern" for blurring the boundary between the shaded area and the irradiated area by using an afterimage effect is generated.

FIG. 6A to FIG. 6D are schematic views that show an example of a set of irradiation patterns. Each irradiation pattern is the light and dark pattern of a light figure that is generated in the illumination area. Here, the irradiation pattern is divided into a plurality of blocks (rectangular unit areas), and one block is regarded as one pixel. One pixel may be associated with one reflecting mirror 44M of the reflecting mirror array 44, or may be associated with a plurality of the reflecting mirrors 44M. When there is a shading object, the irradiation pattern is formed of a shaded area including a plurality of dark pixels and an irradiated area including a plurality of light pixels.

Figure 6A:
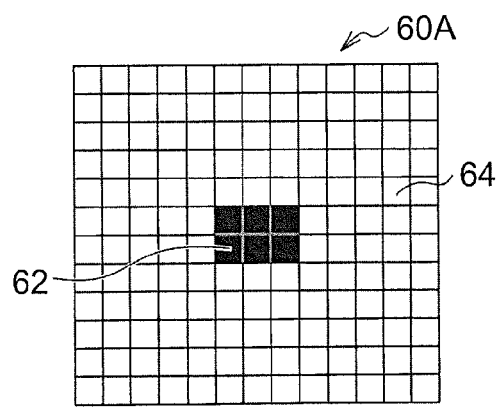
FIG. 6A to FIG. 6D are schematic views that show an example of a set of irradiation patterns.

FIG. 6A shows an example of the "shade pattern". A shaded area 62 including six dark pixels is arranged in a shade pattern 60A such that no light is irradiated toward the shading object, and an irradiated area 64 including light pixels is arranged in an area other than the shaded area 62.

Figure 6B:
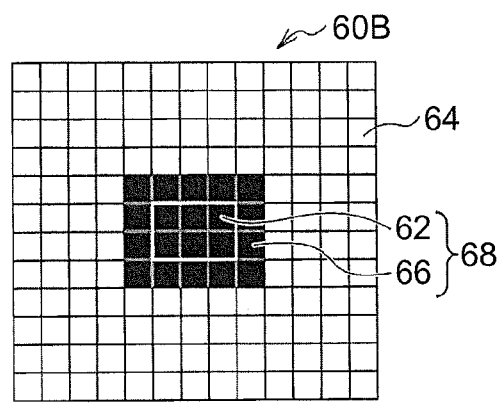
Figure 6C:
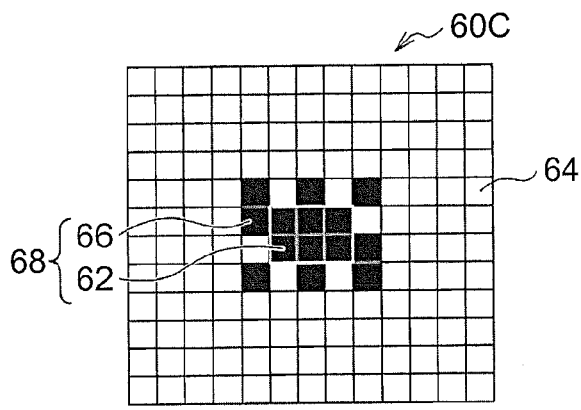
Figure 6D:
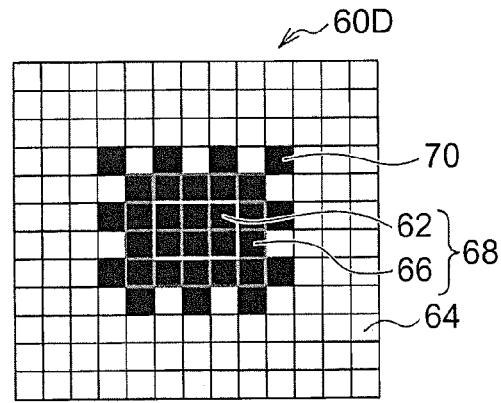

FIG. 6B to FIG. 6D show an example of a set of "blur patterns". in the blur pattern 60B shown in FIG. 6B, the shaded area 62 (portion surrounded by the white frame) including six dark pixels is arranged, and fourteen dark pixels are arranged in a peripheral area 66 that surrounds the shaded area 62. Other than the shaded area 62 or the peripheral area 66, the irradiated area 64 including light pixels is arranged. The shaded area 62 and the peripheral area 66 are arranged so as to be an area 68 having a predetermined shape (in this example, a rectangular shape of four pixels by five pixels).

in the blur pattern 60C shown in FIG. 6C, the shaded area 62 including six dark pixels is arranged, and eight dark pixels and six light pixels are substantially alternately arranged in the peripheral area 66 that surrounds the shaded area 62. Other than the shaded area 62 or the peripheral area 66, the irradiated area 64 comprising light pixels is arranged. The shaded area 62 and the peripheral area 66 are arranged so as to be the area 68 having the predetermined shape.

in the blur pattern 60D shown in FIG. 6D, twenty dark pixels are arranged in the area 68 having the predetermined shape, and eleven dark pixels and eleven light pixels are substantially alternately arranged in a peripheral area 70 that surrounds the area 68. Other than the area 68 or the peripheral area 70, the irradiated area 64 comprising light pixels are arranged.

Subsequently, in step 110, irradiation patterns to be irradiated alternately are selected from among the generated shade pattern and the generated plurality of blur patterns, and the selected irradiation patterns are set. At the same time, an irradiation time, the number of times of irradiation, the irradiation order of the selected irradiation patterns, and the like, are set. When no shading object has been detected and the process proceeds to step 110, the full light pattern is set. Based on the set conditions, control information for setting each of the plurality of reflecting mirrors 44M of the reflecting mirror array 44 to the on state or the off state is generated.

Subsequently, in step 112, irradiation of light from the variable light distribution lights 22 is controlled via the corresponding light drive units 24 based on the generated control information. Thus, the selected irradiation patterns are alternately irradiated. As described above, the irradiation patterns switch in response to the drive frequency of each reflecting mirror array 44.

Generally, even when a plurality of irradiation patterns switch at a frequency of higher than or equal to 30 Hz, a plurality of irradiation patterns cannot be recognized visually. Therefore, when a plurality of irradiation patterns are alternately irradiated at the drive frequency of each reflecting mirror array 44, the boundary between the shaded area 62 and the irradiated area 64 looks blurred because of an afterimage effect. The amount of light of a pixel having a large number of times of irradiation increases, and the amount of light of a pixel having a small number of times of irradiation decreases.

Figure 7:
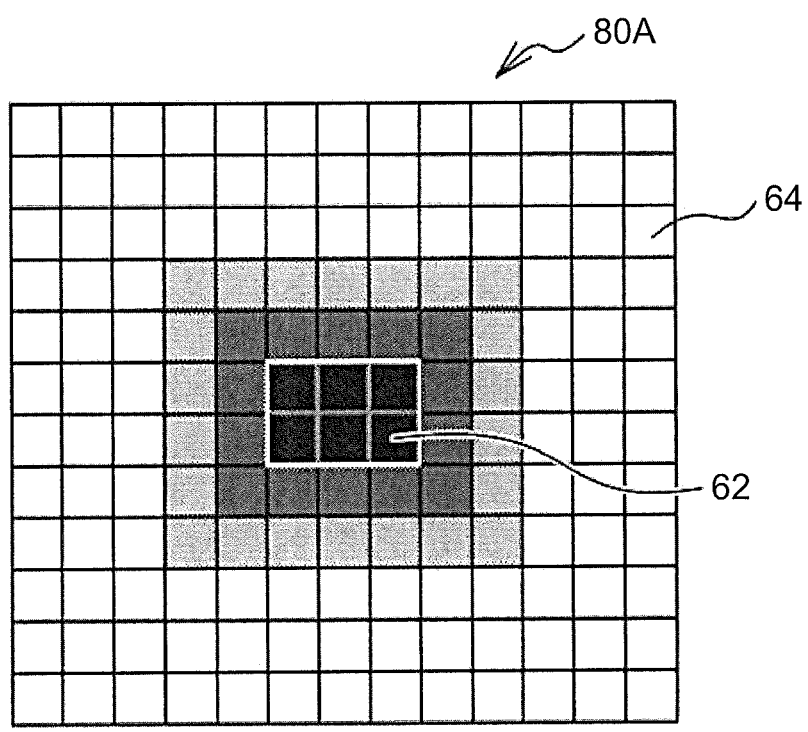
FIG. 7 is a schematic view that shows a light figure in the case where the irradiation patterns shown in FIG. 6A to FIG. 6D are alternately irradiated.

For example, when three types of "blur patterns" shown in FIG. 6B to FIG. 6D are alternately irradiated, a boundary area in which lightness changes in a stepwise manner is generated between the shaded area 62 (portion surrounded by the white frame) and the irradiated area 64 in a light figure 80A that is generated in the illumination area as shown in FIG. 7.

In the above description, an example in which the three types of "blur patterns" shown in FIG. 6B to FIG. 6D are alternately irradiated is described; however, two or more irradiation patterns just need to be selected from among the four types of irradiation patterns shown in FIG. 6A to FIG. 6D and then alternately irradiated in response to a desired mode of the boundary area. For example, the two types of irradiation patterns shown in FIG. 6B and FIG. 6C may be alternately irradiated or the four types of irradiation patterns shown in FIG. 6A to FIG. 6D may be alternately irradiated.

Alternative Embodiments of Irradiation Patterns

Next, alternative embodiments of blur patterns will be described.

First Alternative Embodiment

FIG. 8A to FIG. 8C are schematic views that show another example of a set of irradiation patterns (blur patterns). in the blur pattern 60E shown in FIG. 8A, the shaded area 62 (portion surrounded by the white frame) comprising twelve dark pixels is arranged, and four dark pixels are arranged in the peripheral area 66 on each of both right and left sides of the shaded area 62. Other than the shaded area 62 or the peripheral area 66, the irradiated area 64 comprising light pixels is arranged. The shaded area 62 and the peripheral area 66 are arranged so as to be an area 68 having a predetermined shape (in this example, a rectangular shape of four pixels by five pixels).

Blur patterns shown in FIG. 8B and FIG. 8C are obtained by shifting the area 68 of the blur pattern 60E shown in FIG. 8A leftward or rightward by one pixel in the drawing. The shaded area 62 and the peripheral area 66 are arranged so as to be the area 68 having the predetermined shape.

In the blur pattern 60F shown in FIG. 8B, the shaded area 62 comprising twelve dark pixels is arranged, and eight dark pixels are arranged in the peripheral area 66 on the left side of the shaded area 62. Other than the shaded area 62 or the peripheral area 66, the irradiated area 64 comprising light pixels is arranged.

In the blur pattern 60G shown in FIG. 8C, the shaded area 62 comprising twelve dark pixels is arranged, and eight dark pixels are arranged in the peripheral area 66 on the right side of the shaded area 62. Other than the shaded area 62 or the peripheral area 66, the irradiated area 64 comprising light pixels is arranged.

Figure 9:
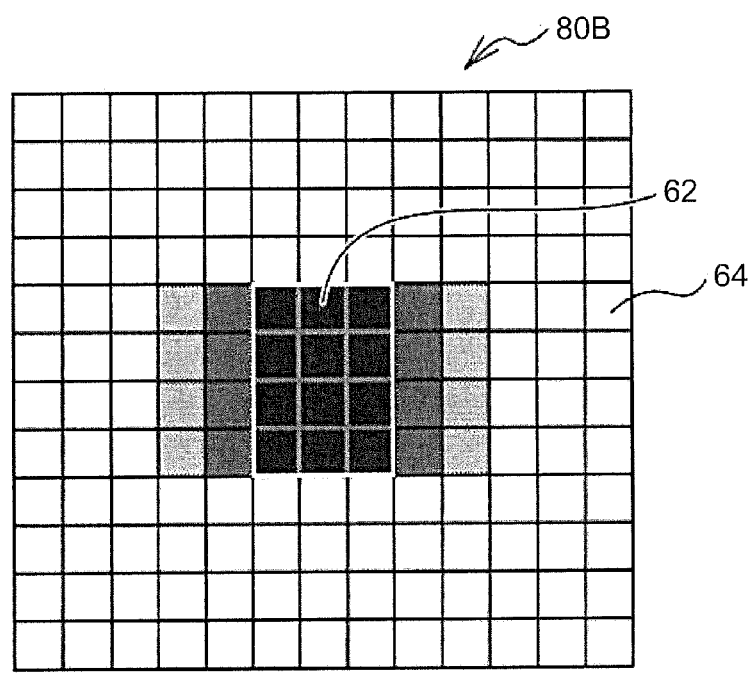
FIG. 9 is a schematic view that shows a light figure in the case where the irradiation patterns shown in FIG. 8A to FIG. 8C are alternately irradiated.

For example, when the three types of "blur patterns" shown in FIG. 8A to FIG. 8C are alternately irradiated, a boundary area in which lightness changes in a stepwise manner is generated between the shaded area 62 (portion surrounded by the white frame) and the irradiated area 64 in a light figure 80B that is generated in the illumination area as shown in FIG. 9. In this case, the boundary area is formed on both right and left sides of the shaded area 62. Two or more irradiation patterns may be selected from among the three types of irradiation patterns shown in FIG. 8A to FIG. 8C and alternately irradiated in response to a desired mode of the boundary area.

Similarly, three types of "blur patterns", that is, the blur pattern 60E shown in FIG. 8A, a blur pattern that is obtained by shifting the area 68 of the blur pattern 60E shown in FIG. 8A upward by one pixel in the drawing and a blur pattern obtained by shifting the area 68 of the blur pattern 60E shown in FIG. 8A downward by one pixel in the drawing, are alternately irradiated, a boundary area is formed on both upper and lower sides of the shaded area.

Second Alternative Embodiment

Figure 10A:
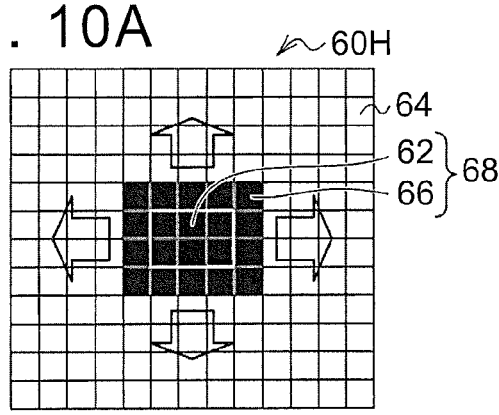
FIG. 10A to FIG. 10E are schematic views that show another example of a set of irradiation patterns.
Figure 10B:
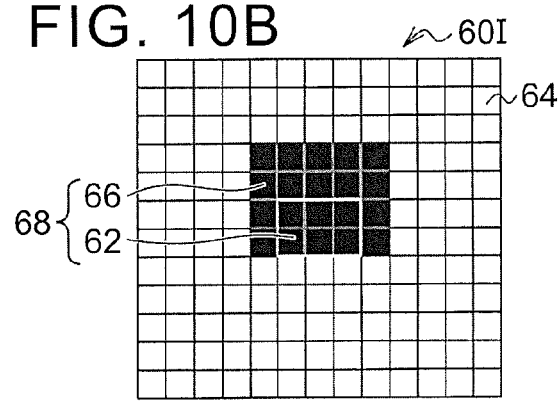
Figure 10C:
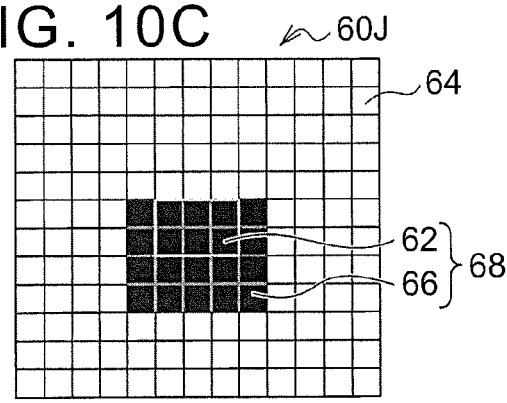

FIG. 10A to FIG. 10C are schematic views that show another example of a set of irradiation patterns (blur patterns). In the blur pattern 60H shown in FIG. 10A, the shaded area 62 (portion surrounded by the white frame) comprising six dark pixels is arranged, and fourteen dark pixels are arranged in the peripheral area 66 that surrounds the shaded area 62. Other than the shaded area 62 or the peripheral area 66, the irradiated area 64 comprising light pixels is arranged. The shaded area 62 and the peripheral area 66 are arranged so as to be the area 68 having a predetermined shape (in this example, a rectangular shape of four pixels by five pixels).

The blur patterns shown in FIG. 10B to FIG. 10E are respectively obtained by shifting the area 68 of the blur pattern 60H shown in FIG. 10A upward, downward, rightward and leftward by one pixel in the drawing. The shaded area 62 and the peripheral area 66 are arranged so as to be the area 68 having the predetermined shape.

In the blur pattern 60I shown in FIG. 10B, the shaded area 62 comprising six dark pixels is arranged, and fourteen dark pixels are arranged in the peripheral area 66 on both right and left sides and upper side of the shaded area 62. Other than the shaded area 62 or the peripheral area 66, the irradiated area 64 comprising light pixels is arranged.

In the blur pattern 60J shown in FIG. 10C, the shaded area 62 comprising six dark pixels is arranged, and fourteen dark pixels are arranged in the peripheral area 66 on both right and left sides and lower side of the shaded area 62. Other than the shaded area 62 or the peripheral area 66, the irradiated area 64 comprising light pixels is arranged.

Figure 10D:
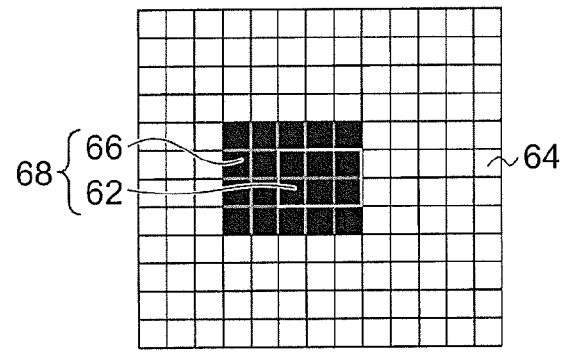

In the blur pattern 60K shown in FIG. 10D, the shaded area 62 comprising six dark pixels is arranged, and fourteen dark pixels are arranged in the peripheral area 66 on the left side and both upper and lower sides of the shaded area 62. Other than the shaded area 62 or the peripheral area 66, the irradiated area 64 comprising light pixels is arranged.

Figure 10E:
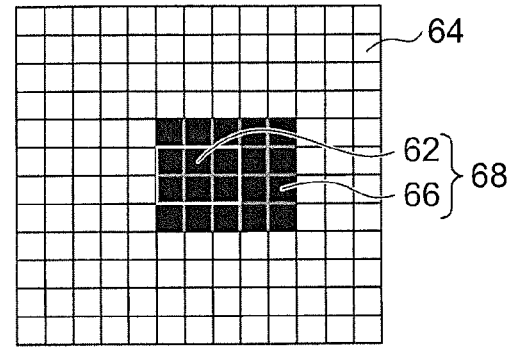

In the blur pattern 60L shown in FIG. 10E, the shaded area 62 comprising six dark pixels is arranged, and fourteen dark pixels are arranged in the peripheral area 66 on the right side and both upper and lower sides of the shaded area 62. Other than the shaded area 62 or the peripheral area 66, the irradiated area 64 comprising light pixels is arranged.

Figure 11:
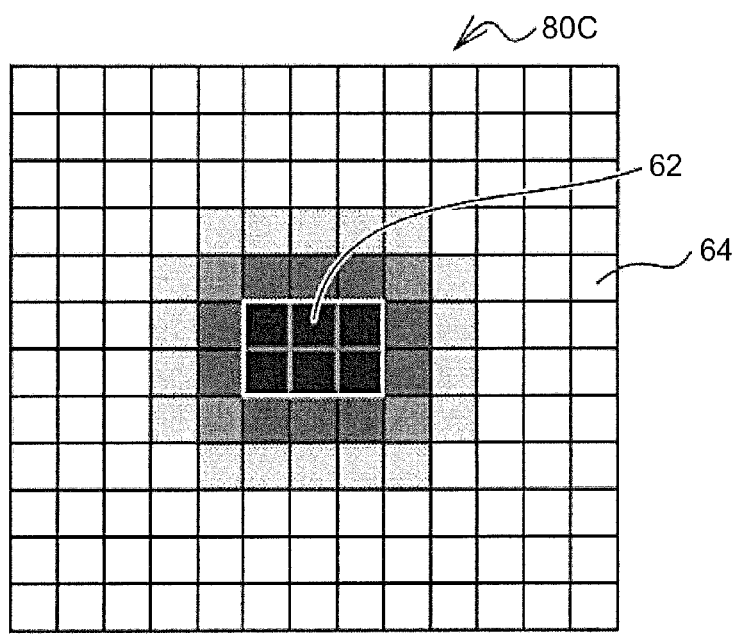
FIG. 11 is a schematic view that shows a light figure in the case where the irradiation patterns shown in FIG. 10A to FIG. 10E are alternately irradiated.

For example, when the five types of "blur patterns" shown in FIG. 10A to FIG. 10E are alternately irradiated, a boundary area in which lightness changes in a stepwise manner because of an afterimage effect is generated between the shaded area 62 (portion surrounded by the white frame) and the irradiated area 64 in a light figure 80C that is generated in the illumination area as shown in FIG. 11. Two or more irradiation patterns may be selected from among the five types of irradiation patterns shown in FIG. 10A to FIG. 10E and alternately irradiated in response to a desired mode of the boundary area.

Third Alternative Embodiment

Figure 12A:
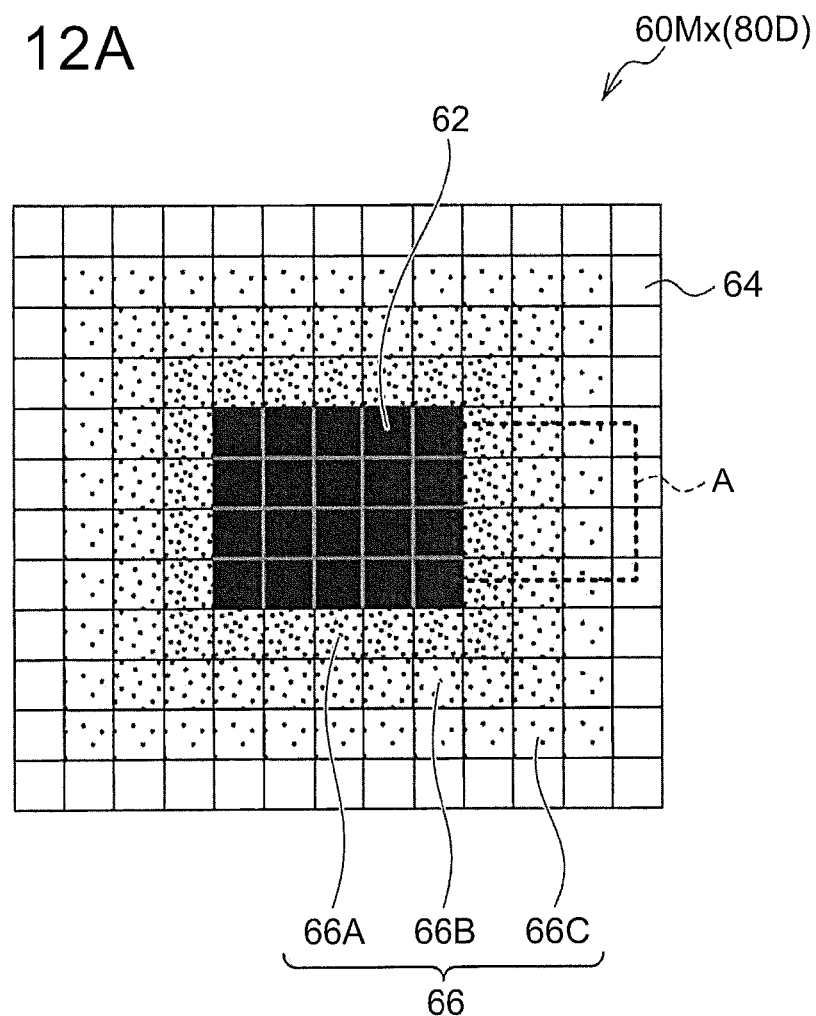
FIG. 12A and FIG. 12B are schematic views that show another example of an irradiation pattern.
Figure 12B:
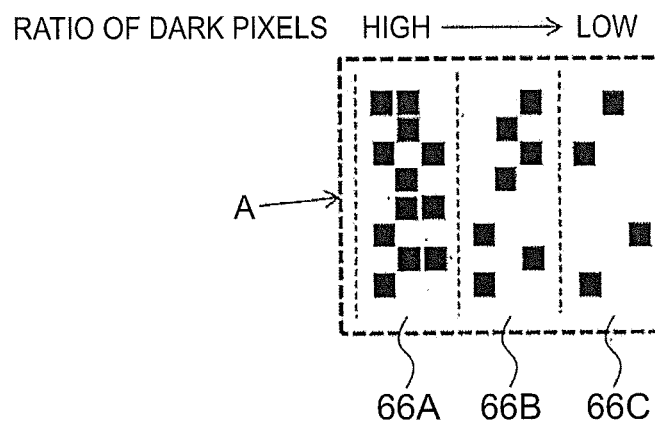

FIG. 12A and FIG. 12B are schematic views that show another example of an irradiation pattern (blur pattern). In this example, one block is formed of a plurality of pixels. in the blur pattern $60M_x$ (x=1) shown in FIG. 12A, the shaded area 62 comprising a plurality of dark pixels is arranged. In the peripheral area 66 that surrounds the shaded area 62, three layers, that is, an intermediate layer 66A, an intermediate layer 66B and an intermediate layer 66C are arranged in the stated order from the shaded area 62 toward the outer side. The number of intermediate layers is not limited to three. The number of intermediate layers may be any number in response to a desired mode of the boundary area.

When the area A in FIG. 12A is enlarged, as shown in FIG. 12B, a plurality of dark pixels and a plurality of light pixels are arranged at a predetermined ratio in each of the three intermediate layers 66A to 66C, and the ratio of dark pixels decreases from the intermediate layer 66A closer to the shaded area 62 toward the outer side. The other blur patterns $60M_x$ (x is an integer larger than or equal to 2) are patterns in which arrangement of a plurality of dark pixels and a plurality of light pixels is changed randomly in each of the intermediate layers 66A to 66C.

For example, when x types of "blur patterns" shown in FIG. 12A are alternately irradiated, a boundary area in which lightness changes in a stepwise manner because of an afterimage effect is generated between the shaded area 62 and the irradiated area 64 in a light figure 80D that is generated in the illumination area as shown in FIG. 12A.

The configuration of the illumination system described in the above embodiment is only illustrative, and, of course, the configuration may be modified without departing from the scope of the invention. For example, blur patterns are not limited to the illustrated ones.

A plurality of irradiation patterns to be alternately irradiated may be a plurality of irradiation patterns in which a shaded area and dark pixels and light pixels around the shaded area are arranged, the shaded area comprise a plurality of dark pixels that shade a shading object, and each of the plurality of irradiation patterns has different arrangement of dark pixels and light pixels from each other. When these plurality of irradiation patterns are alternately irradiated, a boundary area in which lightness changes in a stepwise manner is generated between the shaded area and the irradiated area because of an afterimage effect. Therefore, there are various alternative embodiments for blur patterns.

The embodiments described above provides an illumination system that is able to generate a boundary area in which lightness changes in a stepwise manner, between a shaded area within an illumination area and an irradiated area adjacent to the shaded area.

What is claimed is:

1. An illumination system for a vehicle comprising:
a light irradiation unit including a light source, a reflecting mirror array, and a projecting portion, the reflecting mirror array including a plurality of reflecting mirrors arranged on a substrate, each of the plurality of reflecting mirrors being configured to be independently driven between an on state and an off state based on control information and reflect light, irradiated from the light source, in a direction corresponding to the on state or the off state, the projecting portion being configured to project the light, reflected by the reflecting mirrors in the on state, toward a predetermined illumination area;
an image acquisition unit configured to acquire image information of the illumination area;
an object detecting unit configured to detect a shading object based on the image information of the illumination area, acquired by the image acquisition unit;
an information generating unit configured to generate the control information for setting each of the plurality of reflecting mirrors to the on state or the off state such that a plurality of irradiation patterns are alternately irradiated, each of the plurality of irradiation patterns being a pattern in which a shaded area and dark pixels and light pixels around the shaded area are arranged, the shaded area comprising a plurality of dark pixels that shade the shading object, each of the plurality of irradiation patterns having a different arrangement of the dark pixels and light pixels around the shaded area with respect to each other; and
an irradiation control unit configured to control the light irradiation unit based on the generated control information,
wherein the projecting portion includes a lens, and when a reflecting mirror of the plurality of reflecting mirrors is driven to an off state, the light reflected by the reflecting mirror does not go through the lens.

2. The illumination system according to claim 1, wherein the plurality of irradiation patterns are at least two irradiation patterns selected from among
a first irradiation pattern in which the shaded area and a plurality of dark pixels around the shaded area are arranged in a predetermined shape, the shaded area comprising a plurality of dark pixels that shade the shading object,
a second irradiation pattern in which the shaded area and a plurality of dark pixels and a plurality of light pixels around the shaded area are arranged in the predetermined shape, and
a third irradiation pattern in which a plurality of dark pixels are arranged in the predetermined shape and a plurality of dark pixels and a plurality of light pixels are arranged around the plurality of dark pixels arranged in the predetermined shape.

3. The illumination system according to claim 1, wherein the plurality of irradiation patterns are at least two irradiation patterns selected from among
a first irradiation pattern in which the shaded area and a plurality of dark pixels on both right and left sides of the shaded area are arranged in a predetermined shape, the shaded area comprising a plurality of dark pixels that shade the shading object, a second irradiation pattern in which a plurality of dark pixels are arranged in the predetermined shape such that a plurality of dark pixels are arranged on a left side of the shaded area, and a third irradiation pattern in which a plurality of dark pixels are arranged in the predetermined shape such that a plurality of dark pixels are arranged on a right side of the shaded area.

4. The illumination system according to claim 1, wherein the plurality of irradiation patterns are at least two irradiation patterns selected from among a first irradiation pattern in which the shaded area and a plurality of dark pixels on both upper and lower sides of the shaded area are arranged in a predetermined shape, the shaded area comprising a plurality of dark pixels that shade the shading object, a second irradiation pattern in which a plurality of dark pixels are arranged in the predetermined shape such that a plurality of dark pixels are arranged on an upper side of the shaded area, and a third irradiation pattern in which a plurality of dark pixels are arranged in the predetermined shape such that a plurality of dark pixels are arranged on a lower side of the shaded area.

5. The illumination system according to claim 1, wherein the plurality of irradiation patterns are at least two irradiation patterns selected from among a first irradiation pattern in which the shaded area and a plurality of dark pixels around the shaded area are arranged in a predetermined shape, the shaded area comprising a plurality of dark pixels that shade the shading object, a second irradiation pattern in which a plurality of dark pixels are arranged in the predetermined shape such that a plurality of dark pixels are arranged on both right and left sides and upper side of the shaded area, a third irradiation pattern in which a plurality of dark pixels are arranged in the predetermined shape such that a plurality of dark pixels are arranged on both right and left sides and lower side of the shaded area, a fourth irradiation pattern in which a plurality of dark pixels are arranged in the predetermined shape such that a plurality of dark pixels are arranged on the left side and both upper and lower sides of the shaded area, and a fifth irradiation pattern in which a plurality of dark pixels are arranged in the predetermined shape such that a plurality of dark pixels are arranged on the right side and both upper and lower sides of the shaded area.

6. The illumination system according to claim 1, wherein the plurality of irradiation patterns include a first irradiation pattern in which the shaded area and at least one intermediate layer around the shaded area are arranged, the shaded area comprising a plurality of dark pixels that shade the shading object, a plurality of dark pixels and a plurality of light pixels being arranged at a predetermined ratio in the intermediate layer, and a second irradiation pattern in which the shaded area and the intermediate layer are arranged, arrangement of the plurality of dark pixels and the plurality of light pixels in the intermediate layer being changed randomly different from an layer of the first irradiation pattern.

7. The illumination system according to claim 6, wherein when there are a plurality of intermediate layers, the intermediate layer arranged on an outer side has a lower ratio of dark pixels than a ratio of dark pixels in an intermediate layer arranged on an inner side, the inner side being closer to the shaded area than the outer side.

8. The illumination system according to claim 1, wherein the plurality of irradiation patterns are alternately irradiated, repeatedly, at a predetermined frequency.

* * * * *